C. HERMANN.
AMUSEMENT APPARATUS.
APPLICATION FILED JAN. 13, 1920.
1,354,436.
Patented Sept. 28, 1920.
2 SHEETS—SHEET 2.
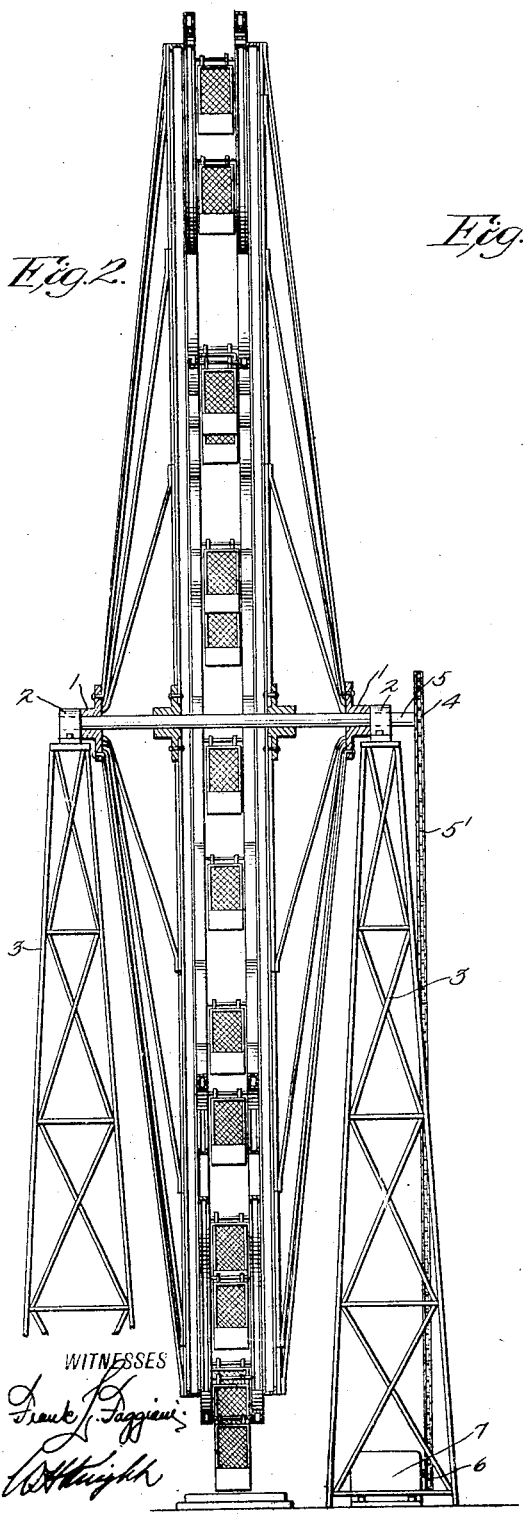
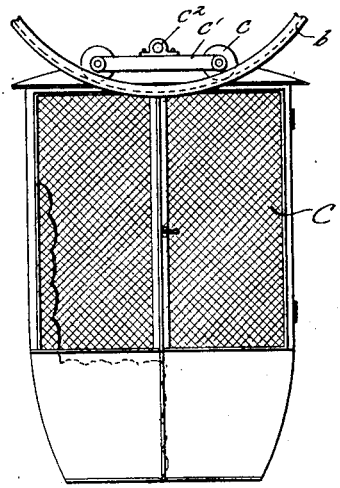
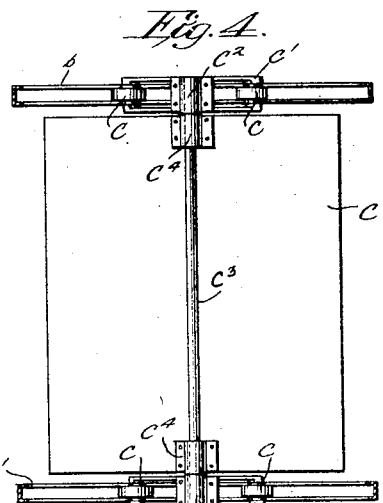
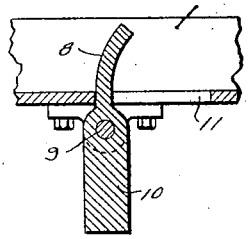
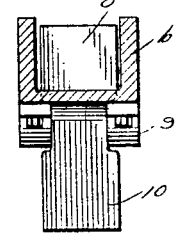
INVENTOR
Charles Hermann
BY
ATTORNEYS

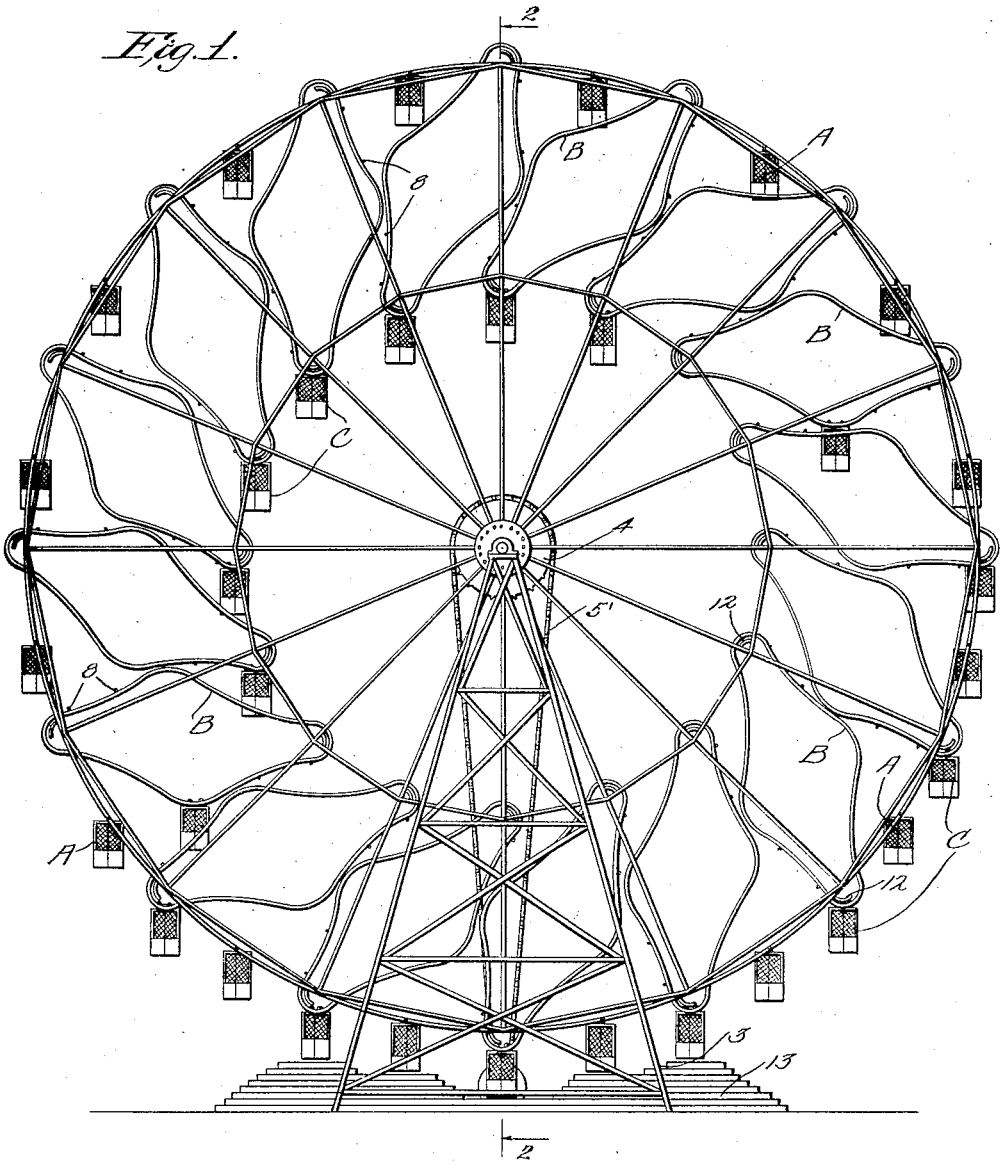

UNITED STATES PATENT OFFICE.

CHARLES HERMANN, OF NEW YORK, N. Y., ASSIGNOR TO ECCENTRIC FERRIS WHEEL AMUSEMENT COMPANY, INCORPORATED, OF NEW YORK, N. Y., A CORPORATION OF NEW YORK.

AMUSEMENT APPARATUS.

1,354,436.     Specification of Letters Patent.     Patented Sept. 28, 1920.

Application filed January 13, 1920. Serial No. 351,128.

*To all whom it may concern:*

Be it known that I, CHARLES HERMANN, a subject of Roumania, and a resident of the city of New York, borough of Manhattan, county and State of New York, have invented a new and Improved Amusement Apparatus, of which the following is a full, clear, and exact description.

The present invention relates to an amusement apparatus and has reference more particularly to a Ferris wheel which embodies some of the features of a gravity railway.

The primary object of the invention is to provide a Ferris wheel which aside from the amusement offered by an apparatus of this kind will also include additional features such as the thrills of a gravity railway or a roller coaster.

In accomplishing this object the invention in its preferred form proposes to provide a Ferris wheel on which some of the passenger carriages are adapted to revolve around the axis of the wheel in fixed position at predetermined intervals around the circumference of the wheel, and with other of the passenger carriages adapted to travel by gravity through a definite irregular path of movement which is realized by providing the Ferris wheel with track units arranged around the axis of the wheel.

The present invention constitutes an improvement on the subject matter of my former Patent #1149513 granted August 10, 1915.

The accompanying drawings illustrate the preferred arrangement of the present invention and will be hereinafter referred to throughout the following description, in said drawing.

Figure 1 is a side elevation of an amusement apparatus illustrating the application of the invention.

Fig. 2 is a cross sectional view through the vertical axis of the apparatus.

Fig. 3 is a side elevation of one of the passenger carriages showing the manner of supporting the same on the tracks.

Fig. 4 is a top plan view of one of the passenger carriages showing the manner of supporting the same on the tracks.

Fig. 5 is a longitudinal section through one of the tracks showing the catch for holding the passenger carriages against a movement on the track in a wrong direction, and Fig. 6 is a cross sectional view of one of the tracks showing the catch referred to in Fig. 5 in elevation.

Referring to the drawings in detail the Ferris wheel is shown as including a structural steel wheel having oppositely spaced hubs 1 positioned near the bearings 2, which are supported on the supporting structures 3, whereby the wheel is free to be rotated or revolved by any suitable driving means such for instance as the sprocket wheel 4 which is fixed to the axle 5 of the wheel and adapted to be driven through the chain 5' from the driving sprocket 6 on the shaft of the motor 7.

Pivotally supported at intervals around the circumference of the wheel are a series of passenger carriages A. These carriages while so supported that they may always assume an upright position and parallel with the vertical axis of the wheel regardless of their elevated position will remain always fixed, so to speak; that is they do not travel toward and from the axis of the wheel. Fixed to the structural steel frame of the wheel are a series of looped track units B each of which comprise a pair of parallel continuous tracks $b$, and $b'$ which are spaced apart and preferably produced from channel members made to receive the rollers $c$ which are mounted with freedom of rotation in the frame $c'$, which in turn are mounted through a journal bearing $c^2$ to the axle $c^3$ of the series of passenger carriages C. Each passenger carriage of the series C is swung from its respective axle $c^3$ by means of the straps or bearings $c^4$ so that the same, like the carriages in the series A may always assume an upright position parallel to the vertical axis of the wheel. The series of looped track units B are irregular in shape and are mounted on the frame of the wheel so that regardless of their position, one side of the tracks will always be inclined so that the passenger carriages C will gravitate to the lowermost part of the track. Inasmuch as the looped track units B are fixed on the frame, as the wheel rotates or revolves the carriages will be caused to travel over the tracks by gravitation and as the shape of the tracks are irregular the sensation realized will be very much the same as a roller coaster or the like.

In some positions of the tracks the tendency of the car may be to travel back after it has gone up an incline of the track, and to overcome this at proper intervals in the track are arranged holding means such for instance as the catches 8 which are pivoted as at 9 on the underside of the channel members comprising the tracks and with their opposite ends weighted as at 10 so that the ends which project through the opening 11 in the track may be presented in the path of the rollers c. The catches are so pivoted relative to the opening 11 in the track that while the rollers may ride over the same and rock the catch against the influence of this weight 10 in one direction after they have once ridden over the catches it will be impossible for them to slide backward as it will be noticed that the catches are operable in one direction only. Furthermore concerning these tracks each of their looped ends are provided with safety devices 12 to prevent derailing of the carriages at this point on the tracks.

It is of course to be understood that the contour of the tracks may be in any suitable shape to produce various sensations. The carriages may be loaded in any suitable manner such for instance as the steps 13 which may be arranged in different heights to accommodate the same to the different elevations that the carriages will assume at the point that they come closest to the surface over which the wheel is supported.

From the above it will be seen that when the wheel is in operation some of the carriages will revolve around a fixed axis while other of the carriages, namely those on the looped track units B while also revolving around a fixed position will also have a path of travel over the irregular track from a point exterior to the perimeter of the wheel to a point within the circumference of the wheel. This arrangement will produce unusual thrills which has heretofore been impossible in an apparatus of this kind with the exception of my former patent on which the improvements herein disclosed are based.

Having thus described my invention, I claim as new and desire to secure by Letters Patent:

1. An amusement apparatus comprising the combination of a wheel structure rotating on a horizontal axis, and a series of passenger carriages mounted thereon and pivotally turning and movable during their travel along looped guides toward and from the axis of rotation of the structure.

2. An amusement apparatus comprising the combination of a wheel structure rotating on a horizontal axis, and a series of passenger carriages mounted thereon and pivotally turning and adapted to move by gravitation along looped guides toward and from the axis of rotation of the structure.

3. An amusement apparatus comprising the combination of a wheel structure rotating on a horizontal axis, and a series of passenger carriages mounted thereon adapted to gravitate along looped guides toward and from the axis of rotation of the structure, said guides having an irregular contour.

4. An amusement apparatus comprising the combination of a wheel structure rotating on a horizontal axis, a series of passenger carriages mounted thereon, a series of independent looped tracks each of which is made to receive one of the passenger carriages and along which the said carriage is adapted to gravitate to and from the axis of rotation of the structure.

5. An amusement apparatus such as set forth in claim 4, and in which the contour of each loop track is irregular whereby the carriage moving thereon by gravitation will be maintained at different points on the track for a given period of time according to the elevated position of the tracks.

6. An amusement apparatus comprising the combination of a wheel structure rotating on a horizontal axis, a series of passenger carriages pivotally fixed at intervals around the circumference of the structure, and a series of passenger carriages pivotally mounted on a series of tracks arranged radially of the structure, said carriages adapted to travel along said tracks by gravity toward and from the axis of rotation of the structure, each of said series of tracks being constructed with means to prevent movement of the carriage on the tracks in the reverse direction.

7. An amusement apparatus such as set forth in claim 6 and in which the contour of the tracks of the series is irregular, and in which the looped ends of said tracks are arranged at an angle to the horizontal axis of the structure.

CHARLES HERMANN.